(12) United States Patent
Luo

(10) Patent No.: US 11,614,315 B1
(45) Date of Patent: Mar. 28, 2023

(54) MULTIFUNCTIONAL WOODWORKING RULER

(71) Applicant: Shenzhen Weiguo Times Technology Co., Ltd., Guangdong (CN)

(72) Inventor: Tingwei Luo, Guangdong (CN)

(73) Assignee: Shenzhen Weiguo Times Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/555,553

(22) Filed: Dec. 20, 2021

(30) Foreign Application Priority Data

Sep. 26, 2021   (CN) .......................... 202122344326.4

(51) Int. Cl.
*G01B 3/04*       (2006.01)
(52) U.S. Cl.
CPC ...................................... *G01B 3/04* (2013.01)
(58) Field of Classification Search
None
See application file for complete search history.

(56) References Cited

U.S. PATENT DOCUMENTS

| | | | | | |
|---|---|---|---|---|---|
| 842,585 | A | * | 1/1907 | Ross .......................... | B43L 7/02 33/469 |
| 2,830,378 | A | * | 4/1958 | Givan ...................... | B25D 5/00 33/679 |
| 3,243,883 | A | * | 4/1966 | Morgan ................. | G01C 21/20 33/1 M |
| 3,371,423 | A | * | 3/1968 | Paul ......................... | B25H 7/00 33/666 |
| 4,087,917 | A | * | 5/1978 | Sheerer ..................... | B43L 7/00 33/448 |
| 4,644,663 | A | * | 2/1987 | Needs ...................... | B25H 7/00 33/476 |
| 5,131,164 | A | * | 7/1992 | Miller ................. | E04F 21/0076 33/613 |
| 6,293,028 | B1 | * | 9/2001 | Sylvia ...................... | G01B 3/08 33/417 |
| 7,269,909 | B1 | * | 9/2007 | Barbieri .................... | B43L 7/12 33/423 |
| 7,748,132 | B1 | * | 7/2010 | Engala ................ | E04F 21/1844 33/527 |

(Continued)

FOREIGN PATENT DOCUMENTS

FR           3098447 A1 *  1/2021  ............. B43L 12/00

*Primary Examiner* — Christopher W Fulton

(57) ABSTRACT

A multifunctional woodworking ruler includes a horizontal ruler, a vertical ruler, two horizontal slidable measurement blocks, a slidable stop block and a vertical slidable measurement device, where the vertical ruler is located at a middle of the horizontal ruler and is perpendicular to the horizontal ruler, each horizontal slidable measurement block is slidably connected to the horizontal ruler, the horizontal slidable measurement blocks are located on two sides of the vertical ruler respectively, the slidable stop block is located at one end of the horizontal ruler, the vertical slidable measurement device is slidably connected to the vertical ruler, and the vertical slidable measurement device includes a vertical slidable measurement block and a fixing plate located at the end of the vertical slidable measurement block away from the horizontal ruler. The detachable lining can be directly replaced, thereby avoiding abrasion to the ruler, and prolonging service life of the ruler.

5 Claims, 2 Drawing Sheets

(56) References Cited

U.S. PATENT DOCUMENTS

| | | | |
|---|---|---|---|
| 7,886,447 B2* | 2/2011 | Cruz | B26D 7/28 |
| | | | 33/41.5 |
| 8,677,646 B2* | 3/2014 | Conigliaro | G01B 5/18 |
| | | | 33/833 |
| 2013/0160313 A1* | 6/2013 | Swanson | G01B 3/04 |
| | | | 33/430 |

* cited by examiner

MULTIFUNCTIONAL WOODWORKING RULER

CROSS REFERENCE TO RELATED APPLICATIONS

The present application claims the benefit of Chinese Patent Application No. 202122344326.4 filed on Sep. 26, 2021, the contents of which are incorporated herein by reference in their entirety.

TECHNICAL FIELD

The present invention belongs to the technical field of woodworking measurement, and particularly relates to a multifunctional woodworking ruler.

BACKGROUND ART

The woodworking ruler is used for measurement in woodworking, of which the lining is non-replaceable in the process of woodworking. After the woodworking ruler is used several times, the lining may be damaged, and when the woodworking ruler is used again, the damaged lining cannot well protect the woodworking ruler, which will cause scratches, abrasion marks, etc. to the woodworking ruler, affecting the attractiveness and the use of the woodworking ruler.

SUMMARY

In view of this, the present invention provides a multifunctional woodworking ruler that may solve the above problem.

The multifunctional woodworking ruler includes a horizontal ruler, a vertical ruler, two horizontal slidable measurement blocks, a slidable stop block and a vertical slidable measurement device, where the vertical ruler is located at a middle of the horizontal ruler and is arranged perpendicular to the horizontal ruler, each of the horizontal slidable measurement blocks is slidably connected to the horizontal ruler, the horizontal slidable measurement blocks are located on two sides of the vertical ruler respectively, the slidable stop block is located at one end of the horizontal ruler, the vertical slidable measurement device is slidably connected to the vertical ruler, the vertical slidable measurement device includes a vertical slidable measurement block and a fixing plate located at the end of the vertical slidable measurement block away from the horizontal ruler, the vertical ruler, each of the horizontal slidable measurement blocks and the slidable stop block are all detachably connected to linings, and each of the horizontal slidable measurement blocks is provided with scales.

Further, the vertical ruler, each of the horizontal slidable measurement blocks and the slidable stop block are all provided with lining fixing members for fixing the linings.

Further, each of the horizontal slidable measurement blocks is provided with a horizontal slidable measurement block fixing member for fixing the horizontal slidable measurement block, the slidable stop block is provided with a slidable stop block fixing member for fixing the slidable stop block, and the vertical slidable measurement block is provided with a vertical slidable measurement block fixing member for fixing the vertical slidable measurement block.

Further, the slidable stop block is provided with scales.

Further, each of the horizontal slidable measurement blocks and the slidable stop block are both provided with first sliding grooves matching the horizontal ruler, and the vertical slidable measurement block is provided with a second sliding groove matching the vertical ruler.

According to the multifunctional woodworking ruler provided by the present invention, compared with the prior art, the detachable lining may be directly replaced without replacing the woodworking ruler for object measurement, and a replaced lining may well protect the woodworking ruler anew, thereby avoiding abrasion to the woodworking ruler when the woodworking ruler is fixed on an object, improving attractiveness of the woodworking ruler, and prolonging service life of the woodworking ruler.

DETAILED DESCRIPTION OF THE DRAWINGS

The particular embodiment of the present invention is further described in detail below. It should be understood that the description of the embodiment of the present invention here is not used to limit the scope of protection of the present invention.

Figure 1:
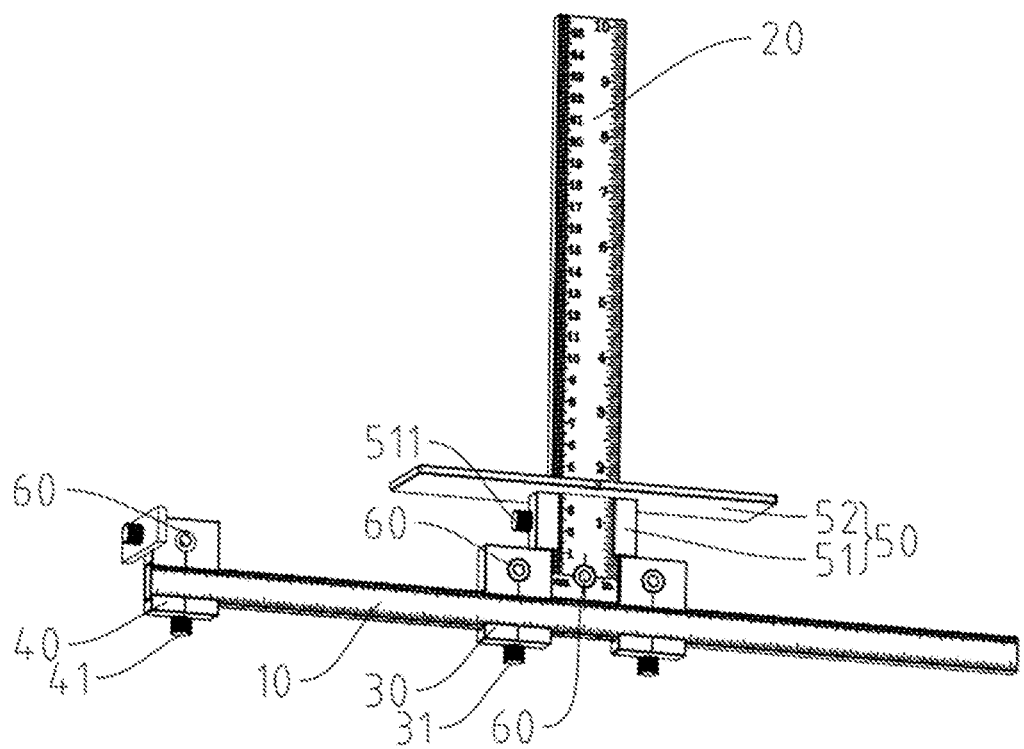
FIG. 1 is a structural schematic diagram of a multifunctional woodworking ruler provided by the present invention.
Figure 2:
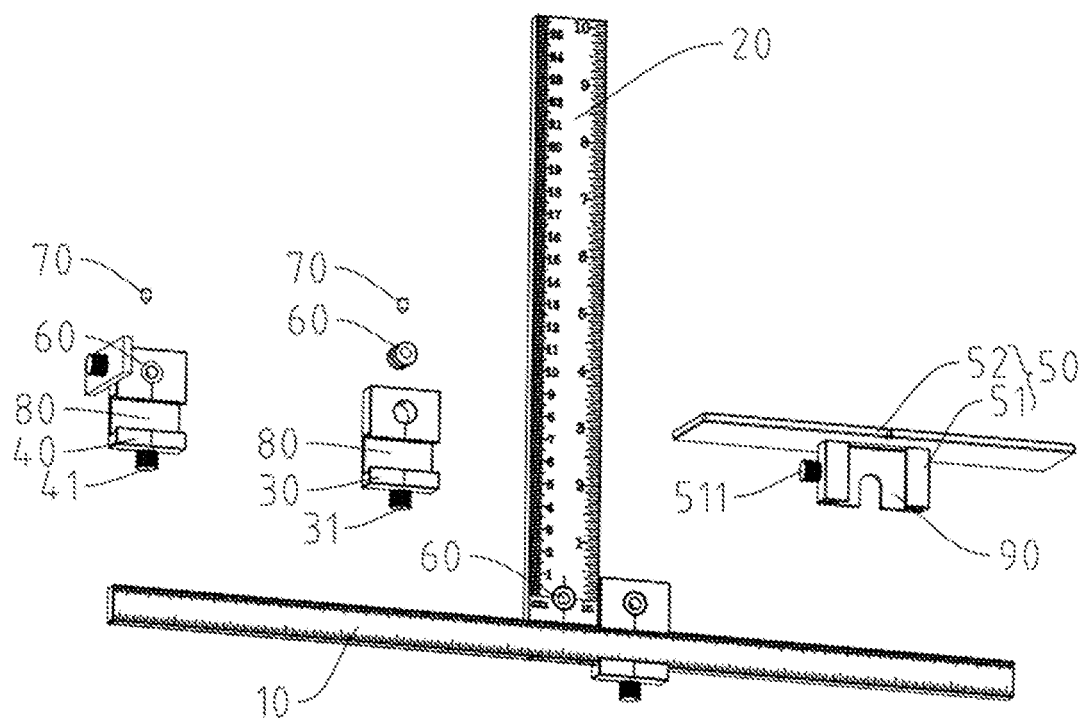
FIG. 2 is an exploded view of the multifunctional woodworking ruler.

As shown in FIGS. 1 and 2, which are structural schematic diagrams of a multifunctional woodworking ruler provided by the present invention, the multifunctional woodworking ruler includes a horizontal ruler 10, a vertical ruler 20, two horizontal slidable measurement blocks 30, a slidable stop block 40 and a vertical slidable measurement device 50, where the vertical ruler 20 is located at a middle of the horizontal ruler 10 and is arranged perpendicular to the horizontal ruler 10, each of the horizontal slidable measurement blocks 30 is slidably connected to the horizontal ruler 10, the horizontal slidable measurement blocks are located on two sides of the vertical ruler 20 respectively, the slidable stop block 40 is located at one end of the horizontal ruler 10, the vertical slidable measurement device 50 is slidably connected to the vertical ruler 20, the vertical slidable measurement device 50 includes a vertical slidable measurement block 51 and a fixing plate 52 located at the end of the vertical slidable measurement block 51 away from the horizontal ruler 10, the vertical ruler 20, each of the horizontal slidable measurement blocks 30 and the slidable stop block 40 are all detachably connected to linings 60, and each of the horizontal slidable measurement blocks 30 is provided with scales. The horizontal ruler 10 and the vertical ruler 20 are fixed on a measured object by means of the linings 60 on the vertical ruler 20, each horizontal slidable measurement block 30 and the slidable stop block 40; and when the linings 60 on the vertical ruler 20, each horizontal slidable measurement block 30 and the slidable stop block 40 are damaged, the detachable linings 60 may be directly replaced without replacing the woodworking ruler for object measurement, and replaced linings 60 may well protect the woodworking ruler anew, thereby avoiding abrasion to the woodworking ruler when the woodworking ruler is fixed on the object, improving attractiveness of the woodworking ruler, and prolonging service life of the woodworking ruler. It needs to be noted that the slidable stop block 40 have a fixing effect when the woodworking ruler is fixed; and the fixing plate 52 of the vertical slidable measurement device 50 abuts against a top end of a measured object, and matches the linings 60 on the vertical ruler 20, each horizontal slidable measurement block 30 and the slidable stop block 40, so as to fix the woodworking ruler on the measured object.

The vertical ruler 20, each of the horizontal slidable measurement blocks 30 and the slidable stop block 40 are all provided with lining fixing members 70 for fixing the linings 60. After the linings 60 are mounted, the linings are fixed on the vertical ruler 20, each horizontal slidable measurement block 30 and the slidable stop block 40 by means of the lining fixing members 70.

Each of the horizontal slidable measurement blocks 30 is provided with a horizontal slidable measurement block fixing member 31 for fixing the horizontal slidable measurement block 30, the slidable stop block 40 is provided with a slidable stop block fixing member 41 for fixing the slidable stop block 40, and the vertical slidable measurement block 51 is provided with a vertical slidable measurement block fixing member 511 for fixing the vertical slidable measurement block 51. After the horizontal slidable measurement block 30 is moved, the horizontal slidable measurement block is fixed on the horizontal ruler 10 by means of the horizontal slidable measurement block fixing member 31; and after the slidable stop block 40 is mounted the horizontal ruler 10, the slidable stop block is fixed on the horizontal ruler 10 by means of the slidable stop block fixing member 41; and after the vertical slidable measurement block 51 is moved, the vertical slidable measurement block is fixed on the vertical ruler 20 by means of the vertical slidable measurement block fixing member 511.

The slidable stop block 40 is provided with scales.

Each of the horizontal slidable measurement blocks 30 and the slidable stop block 40 are both provided with first sliding grooves 80 matching the horizontal ruler 10, and the vertical slidable measurement block 51 is provided with a second sliding groove 90 matching the vertical ruler 20.

According to the multifunctional woodworking ruler provided by the present invention, compared with the prior art, the detachable lining 60 may be directly replaced without replacing the woodworking ruler for object measurement, and the replaced lining 60 may well protect the woodworking ruler anew, thereby avoiding the abrasion to the woodworking ruler when the woodworking ruler is fixed on the object, improving the attractiveness of the woodworking ruler, and prolonging the service life of the woodworking ruler.

The above embodiment is merely a preferred embodiment of the present invention but is not used to limit the scope of protection of the present invention, and any modifications, equivalent replacements, improvements, etc. within the spirit of the present invention are covered within the scope of claims of the present invention.

What is claimed is:

1. A multifunctional woodworking ruler, comprising a horizontal ruler, a vertical ruler, two horizontal slidable measurement blocks, a slidable stop block and a vertical slidable measurement device, wherein the vertical ruler is located at a middle of the horizontal ruler and is arranged perpendicular to the horizontal ruler, each of the horizontal slidable measurement blocks is slidably connected to the horizontal ruler, the horizontal slidable measurement blocks are located on two sides of the vertical ruler respectively, the slidable stop block is located at one end of the horizontal ruler, the vertical slidable measurement device is slidably connected to the vertical ruler, the vertical slidable measurement device comprises a vertical slidable measurement block and a fixing plate located at the end of the vertical slidable measurement block away from the horizontal ruler, the vertical ruler, each of the horizontal slidable measurement blocks and the slidable stop block are all detachably connected to linings, and each of the horizontal slidable measurement blocks is provided with scales.

2. The multifunctional woodworking ruler of claim 1, wherein the vertical ruler, each of the horizontal slidable measurement blocks and the slidable stop block are all provided with lining fixing members for fixing the linings.

3. The multifunctional woodworking ruler of claim 1, wherein each of the horizontal slidable measurement blocks is provided with a horizontal slidable measurement block fixing member for fixing the horizontal slidable measurement block, the slidable stop block is provided with a slidable stop block fixing member for fixing the slidable stop block, and the vertical slidable measurement block is provided with a vertical slidable measurement block fixing member for fixing the vertical slidable measurement block.

4. The multifunctional woodworking ruler of claim 1, wherein the slidable stop block is provided with scales.

5. The multifunctional woodworking ruler of claim 1, wherein each of the horizontal slidable measurement blocks and the slidable stop block are both provided with first sliding grooves matching the horizontal ruler, and the vertical slidable measurement block is provided with a second sliding groove matching the vertical ruler.

* * * * *

EX PARTE REEXAMINATION CERTIFICATE (12772nd)
United States Patent
Luo

(10) Number: US 11,614,315 C1
(45) Certificate Issued: Nov. 21, 2024

(54) MULTIFUNCTIONAL WOODWORKING RULER

(71) Applicant: Shenzhen Weiguo Times Technology Co., Ltd., Guangdong (CN)

(72) Inventor: Tingwei Luo, Guangdong (CN)

(73) Assignee: Shenzhen Weiguo Times Technology Co., Ltd.

Reexamination Request:
No. 90/015,273, Aug. 14, 2023

Reexamination Certificate for:
Patent No.: 11,614,315
Issued: Mar. 28, 2023
Appl. No.: 17/555,553
Filed: Dec. 20, 2021

(51) Int. Cl.
*G01B 3/04* (2006.01)

(52) U.S. Cl.
CPC ................... *G01B 3/04* (2013.01)

(58) Field of Classification Search
CPC ................ B23B 47/287; G01B 3/04
See application file for complete search history.

(56) References Cited

To view the complete listing of prior art documents cited during the proceeding for Reexamination Control Number 90/015,273, please refer to the USPTO's Patent Electronic System.

*Primary Examiner* — Beverly M Flanagan

(57) ABSTRACT

A multifunctional woodworking ruler includes a horizontal ruler, a vertical ruler, two horizontal slidable measurement blocks, a slidable stop block and a vertical slidable measurement device, where the vertical ruler is located at a middle of the horizontal ruler and is perpendicular to the horizontal ruler, each horizontal slidable measurement block is slidably connected to the horizontal ruler, the horizontal slidable measurement blocks are located on two sides of the vertical ruler respectively, the slidable stop block is located at one end of the horizontal ruler, the vertical slidable measurement device is slidably connected to the vertical ruler, and the vertical slidable measurement device includes a vertical slidable measurement block and a fixing plate located at the end of the vertical slidable measurement block away from the horizontal ruler. The detachable lining can be directly replaced, thereby avoiding abrasion to the ruler, and prolonging service life of the ruler.

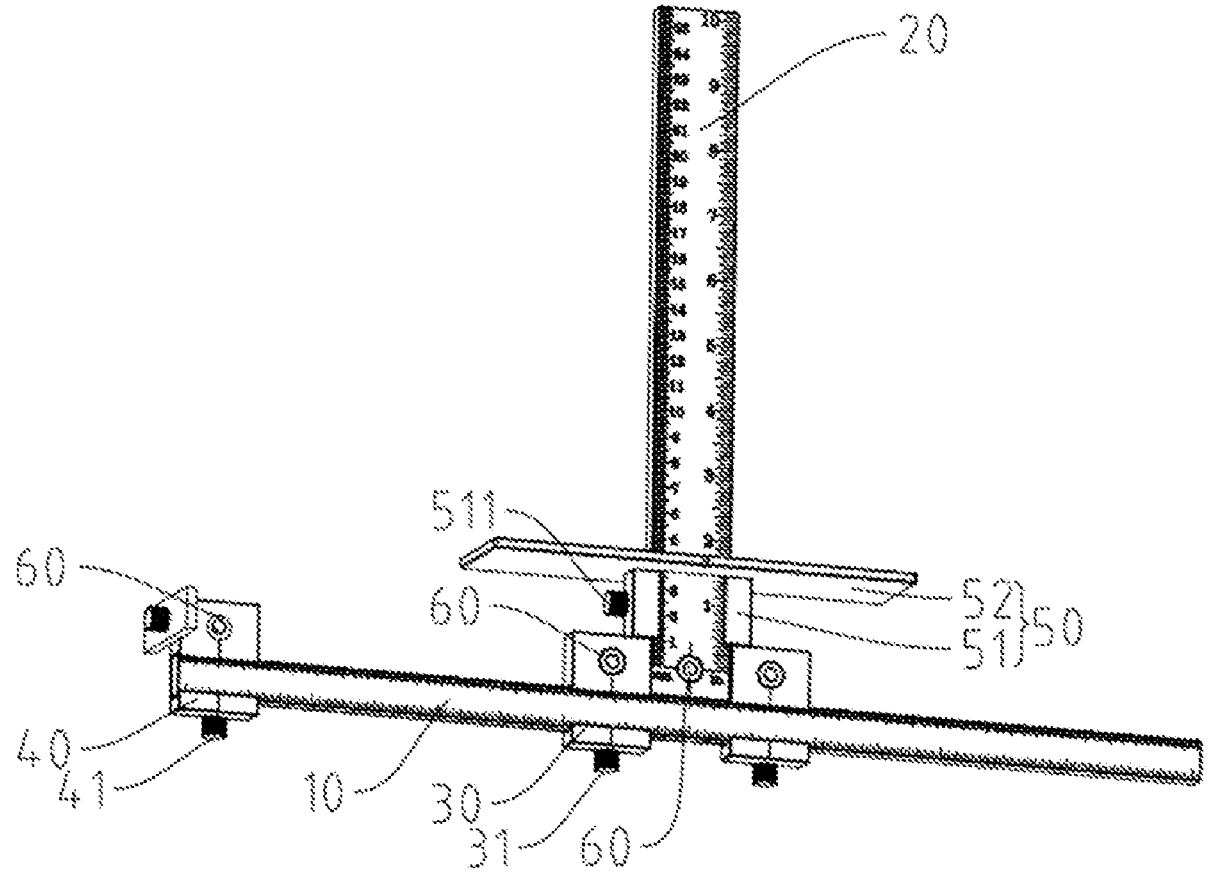

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-5 are cancelled.

\* \* \* \* \*